(12) United States Patent
Krishnan et al.

(10) Patent No.: US 12,504,514 B2
(45) Date of Patent: Dec. 23, 2025

(54) SENSOR ASSEMBLY WITH CLEANING

(71) Applicant: Ford Global Technologies, LLC, Dearborn, MI (US)

(72) Inventors: Venkatesh Krishnan, Canton, MI (US); Michael Robertson, Jr., Garden City, MI (US); Tony Misovski, Oxford, MI (US); Rashaun Phinisee, Ypsilanti, MI (US); Segundo Baldovino, Novi, MI (US); Vahan Kazandjian, Warrington, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1135 days.

(21) Appl. No.: 17/475,376

(22) Filed: Sep. 15, 2021

(65) Prior Publication Data

US 2023/0080514 A1 Mar. 16, 2023

(51) Int. Cl.
| | |
|---|---|
| G01S 7/481 | (2006.01) |
| B60S 1/54 | (2006.01) |
| B60S 1/56 | (2006.01) |
| G01D 11/24 | (2006.01) |
| G01D 11/26 | (2006.01) |
| G01D 11/30 | (2006.01) |
| G01L 19/14 | (2006.01) |
| G01S 17/931 | (2020.01) |

(52) U.S. Cl.
CPC .......... *G01S 7/4813* (2013.01); *G01D 11/24* (2013.01); *G01D 11/245* (2013.01); *G01D 11/26* (2013.01); *G01D 11/30* (2013.01); *G01L 19/14* (2013.01); *G01S 17/931* (2020.01); *B60S 1/54* (2013.01); *B60S 1/56* (2013.01)

(58) Field of Classification Search
CPC ........ G01S 7/4813; G01S 17/931; B60S 1/54; B60S 1/56; G01D 11/24; G01D 11/245; G01D 11/30; G01D 11/26; G01L 19/14
USPC .......................................................... 73/431
See application file for complete search history.

(56) References Cited

U.S. PATENT DOCUMENTS

| | | | |
|---|---|---|---|
| 11,059,457 B1 * | 7/2021 | Rivera | G01S 17/931 |
| 12,140,705 B2 * | 11/2024 | Phinisee | G01S 7/4813 |
| 2020/0216034 A1 * | 7/2020 | Velasco | B60S 1/528 |
| 2020/0324738 A1 * | 10/2020 | Kubota | B60R 11/04 |
| 2021/0063093 A1 * | 3/2021 | Tobiassen | G01S 17/88 |
| 2021/0103036 A1 * | 4/2021 | Robertson, Jr. | F28F 3/025 |
| 2022/0043120 A1 * | 2/2022 | Baldovino | G01S 17/931 |
| 2022/0268892 A1 * | 8/2022 | Phinisee | G01S 17/931 |

(Continued)

FOREIGN PATENT DOCUMENTS

| | | | | |
|---|---|---|---|---|
| DE | 4019930 A1 * | 1/1992 | | B60H 1/34 |
| FR | 3147387 A1 * | 10/2024 | | G01S 17/931 |

(Continued)

*Primary Examiner* — Stephanie E Bloss
*Assistant Examiner* — Kevin C Butler
(74) *Attorney, Agent, or Firm* — Frank A. MacKenzie; Brooks Kushman P.C.

(57) ABSTRACT

A sensor assembly includes a housing including an outlet, a sensor including a sensor window, and a flap rotatably coupled to the housing at the outlet. The sensor window is fixed to the housing. The outlet is aimed across the sensor window. The flap is rotatable between an open position angled away from the outlet and a closed position extending across the outlet.

21 Claims, 6 Drawing Sheets

(56) References Cited

U.S. PATENT DOCUMENTS

| | | | |
|---|---|---|---|
| 2023/0135961 A1* | 5/2023 | Hamilton | B60S 1/66 |
| | | | 134/123 |
| 2024/0200989 A1* | 6/2024 | Phinisee | G01D 11/245 |
| 2024/0239307 A1* | 7/2024 | Ning | G01S 7/4043 |

FOREIGN PATENT DOCUMENTS

| | | | | |
|---|---|---|---|---|
| WO | WO-2007134993 A1 * | 11/2007 | | B60S 1/0848 |
| WO | WO-2016004936 A1 * | 1/2016 | | B60S 1/56 |
| WO | WO-2024199750 A1 * | 10/2024 | | G01S 17/931 |

* cited by examiner

SENSOR ASSEMBLY WITH CLEANING

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
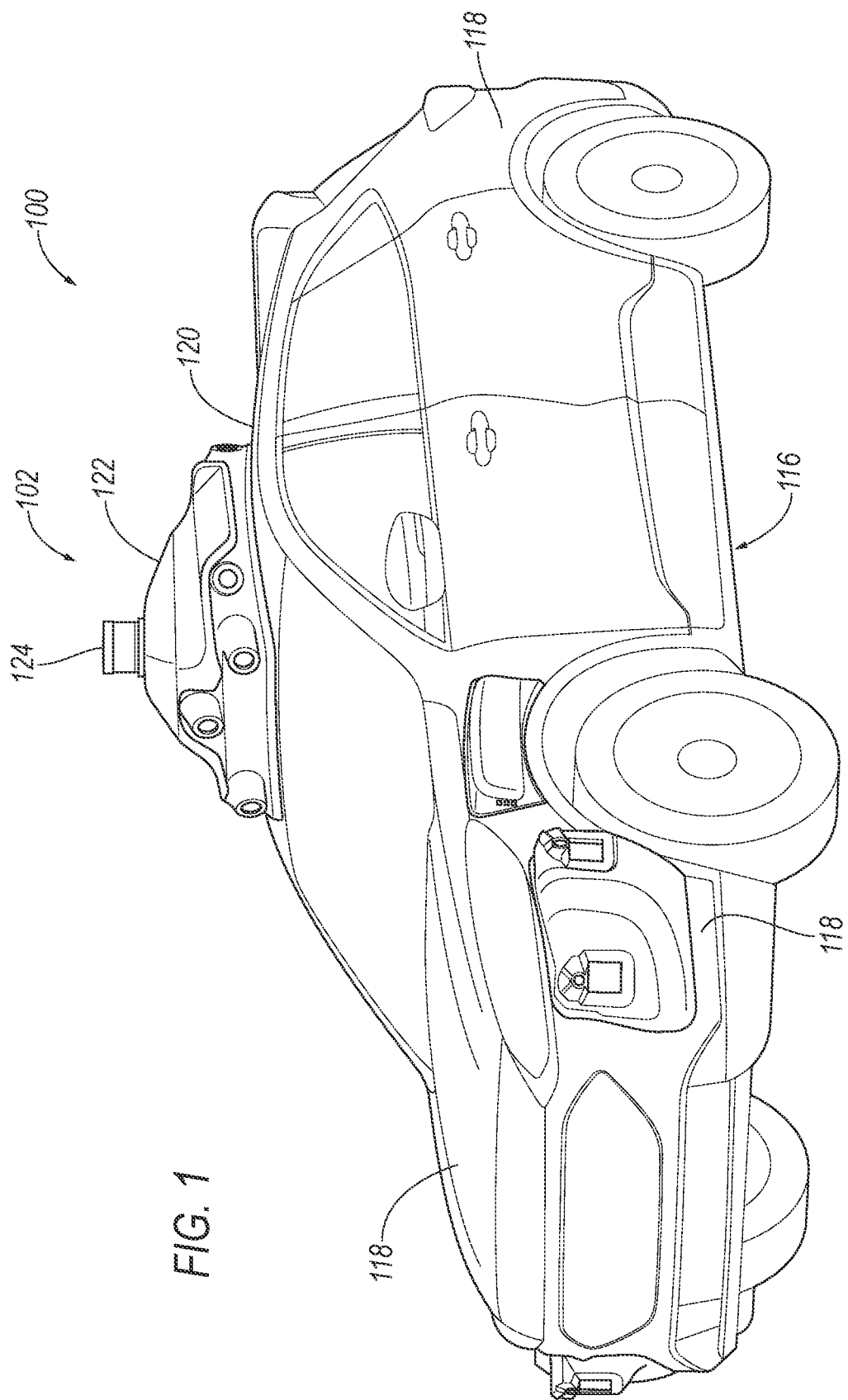
FIG. 1 is a perspective view of an example vehicle with a sensor assembly.

A sensor assembly includes a housing including an outlet, a sensing device including a sensor window, and a flap rotatably coupled to the housing at the outlet. The sensor window is fixed relative to the housing. The outlet is aimed across the sensor window. The flap is rotatable between an open position angled away from the outlet and a closed position extending across the outlet.

The sensor assembly may further include a member fixed to the housing and positioned to block the flap from opening farther from the outlet than the open position.

The outlet may be elongated parallel to the sensor window alongside the sensor window in a direction of elongation, and the flap in the closed position may extend across the outlet in a direction perpendicular to the direction of elongation. The sensor assembly may further include a plurality of flaps including the flap, the flaps each being rotatable between the open position angled away from the outlet and the closed position extending across the outlet in the direction perpendicular to the direction of elongation. The flaps may be arranged in series along the direction of elongation of the outlet. The flaps may be spaced from each other along the direction of elongation.

The sensor assembly may further include a member fixed to the housing and positioned to block the flaps from opening farther from the outlet than the open position.

The flaps may include vanes, and the vanes may be positioned to extend into the outlet when the flaps are in the closed position. The vanes may be elongated perpendicular to the direction of elongation of the outlet.

The flaps may be rotatable independently of each other.

The housing may include a cylindrical panel, and the sensor window may be recessed from the cylindrical panel. The housing may include a recess panel extending radially inward from the cylindrical panel toward the sensor window, and the recess panel may include the outlet. The outlet may be elongated parallel to an axis defined by the cylindrical panel.

The sensor assembly may further include a member fixed to the recess panel and positioned to block the flap from opening farther from the outlet than the open position. The flap in the open position may be inside an outer radius of the cylindrical panel.

The recess panel may be a first recess panel, the housing may include a second recess panel extending radially inward from the cylindrical panel toward the sensor window, and the second recess panel may be positioned on an opposite side of the sensor window than the first recess panel. The sensor assembly may further include a back panel fixed relative to the housing, positioned radially outward from the second recess panel, and spaced from the housing. The back panel may extend circumferentially from a first edge nearer to the sensor window to a second edge farther from the sensor window, and a radial distance between the back panel and the housing at the first edge may be greater than a radial distance between the back panel and the housing at the second edge.

The sensor assembly may further include a rib extending from the housing to the back panel.

The sensor assembly may further include a base, and the housing may be rotatably coupled to the base to rotate about an axis defined by the cylindrical panel.

With reference to the Figures, wherein like numerals indicate like parts throughout the several views, a sensor assembly 102 for a vehicle 100 includes a housing 104 including at least one outlet 106, at least one sensing device 108 including a respective sensor window 110, and at least one flap 112 rotatably coupled to the housing 104 at the outlet 106. The sensor window 110 is fixed to the housing 104. The outlet 106 is aimed across the sensor window 110. The flap 112 is rotatable between an open position angled away from the outlet 106 and a closed position extending across the outlet 106.

The rotation of the flap 112 between the open position and the closed position can temporarily impede airflow through the outlet 106. As a result, the airflow reaching the sensor window 110 may be pulsed, i.e., fluctuates up and down in terms of velocity. The pulsed airflow can be more effective at removing small water droplets from the sensor window 110 than constant airflow. For example, airflow with a constant velocity of 20 meters per second (m/s) may fairly consistently remove a water droplet with a diameter of 2 millimeters but may remove a water droplet with a diameter of 0.5 millimeters less quickly or consistently. The pulsed airflow may remove the smaller water droplet more quickly and consistently than the constant airflow. Moreover, the pulsed airflow can have a greater maximum velocity than the constant airflow with a same pressurized-air source 114 supplying the outlet 106, which may more effectively remove debris. Keeping the sensor window 110 clearer of water and/or debris may provide more accurate data from the sensing device 108.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. A computer can be programmed to operate the vehicle 100 independently of the intervention of a human operator, completely or to a lesser degree. The computer may be programmed to operate the propulsion, brake system, steering system, and/or other vehicle systems based in part of data received from the sensing devices 108. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a body 116. The vehicle 100 may be of a unibody construction, in which a frame and the body 116 of the vehicle 100 are a single component. The vehicle 100 may, alternatively, be of a body-on-frame construction, in which the frame supports the body 116 that is a separate component from the frame. The frame and body 116 may be formed of any suitable material, for example, steel, aluminum, etc. The body 116 includes body panels 118 partially defining an exterior of the vehicle 100. The body panels 118 may present a class-A surface, e.g., a finished surface exposed to view by a customer and free of unaesthetic blemishes and defects. The body panels 118 include, e.g., a roof 120, etc.

The sensor assembly 102 includes a casing 122 attachable to the vehicle 100, e.g., to one of the body panels 118 of the vehicle 100, e.g., the roof 120. For example, the casing 122 may be shaped to be attachable to the roof 120, e.g., may have a shape matching a contour of the roof 120. The casing 122 may be attached to the roof 120, which can provide the sensing devices 108 with an unobstructed field of view of an area around the vehicle 100. The casing 122 may be formed of, e.g., plastic or metal.

Figure 2:
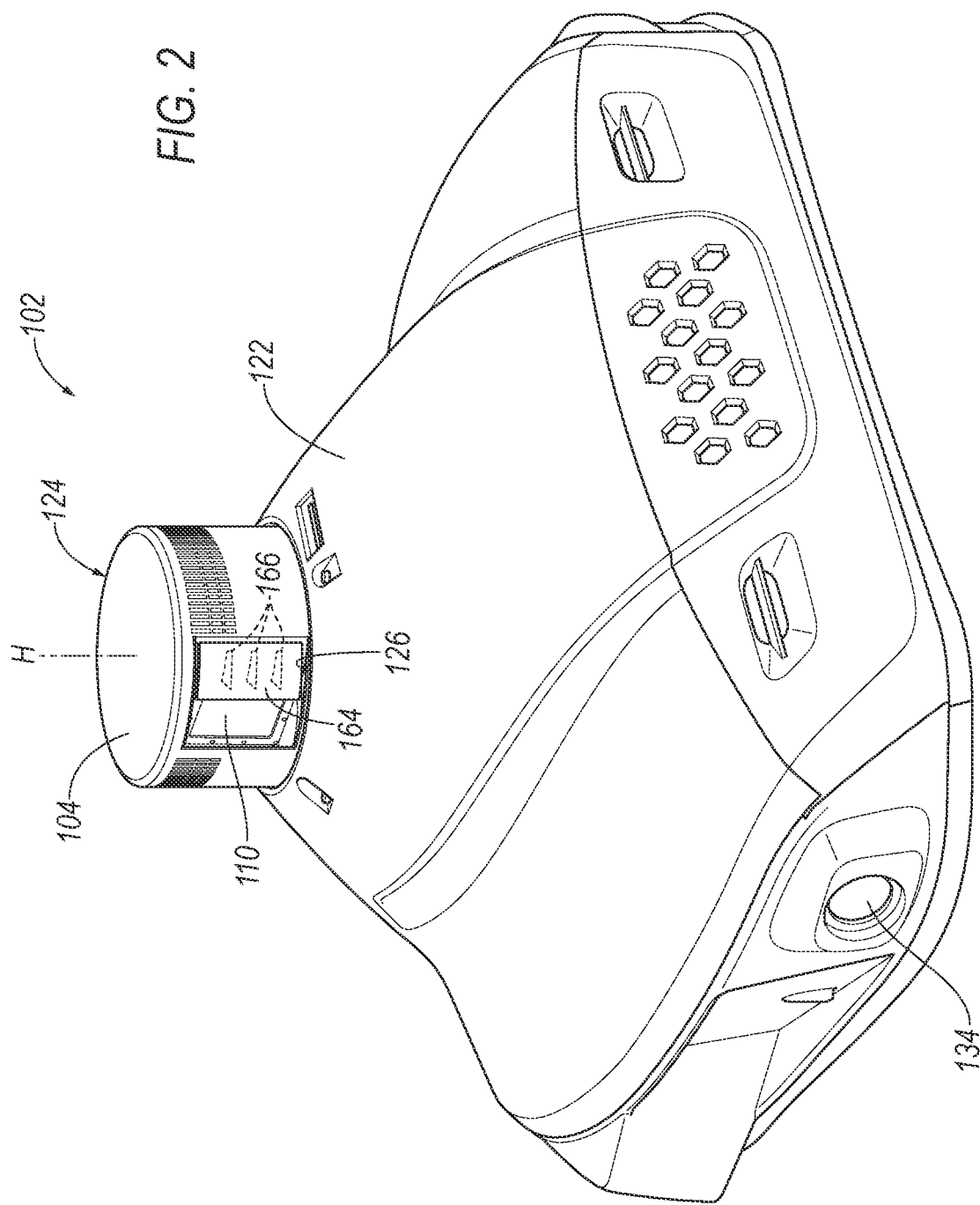
FIG. 2 is a rear perspective view of the sensor assembly.

With reference to FIG. 2, a sensor unit 124 including the sensing devices 108 and the housing 104 is supported by the casing 122. The sensor unit 124 can be disposed on top of the casing 122 at a highest point of the casing 122. The casing 122 includes an aperture 126 through which the sensor unit 124 passes. The aperture 126 is round, e.g., has a circular or slightly elliptical shape. The aperture 126 is centered on a housing axis H. The aperture 126 of the casing 122 is a highest point of the casing 122.

Figure 3:
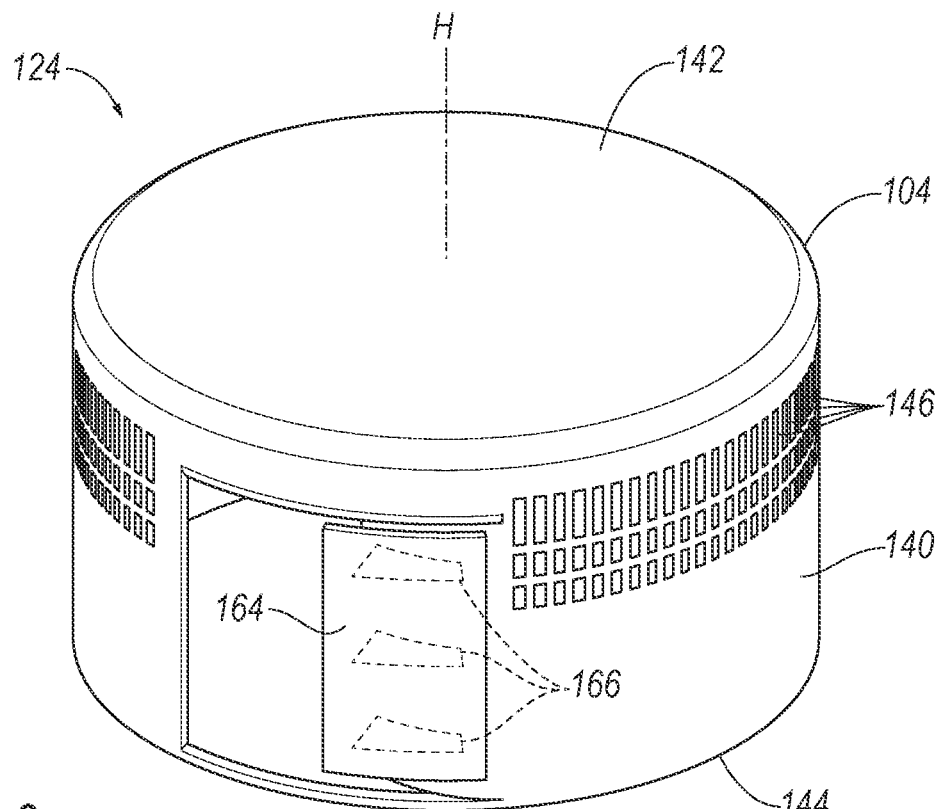
FIG. 3 is an exploded perspective view of a sensor unit of the sensor assembly.
Figure 3:
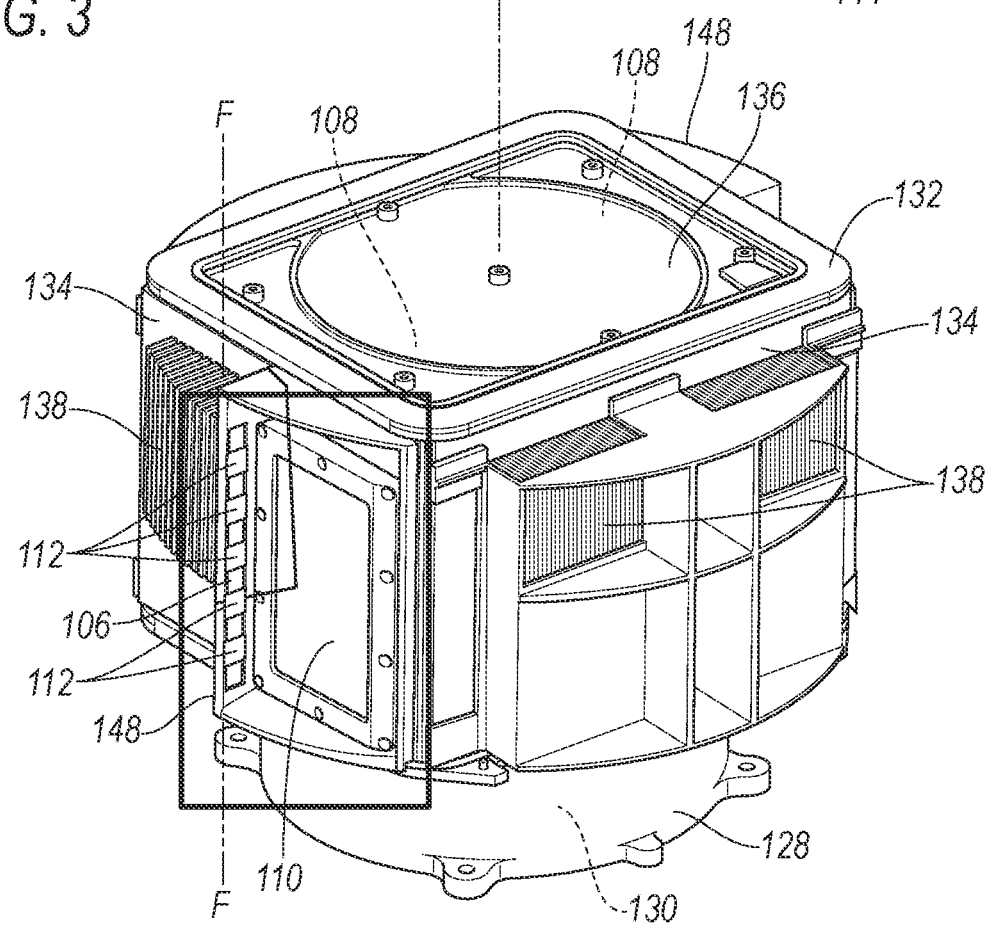

With reference to FIG. 3, the sensor unit 124 includes a base 128, a motor 130, a sensor body 132, the at least one sensing device 108, the at least one sensor window 110, and the housing 104. The base 128 is attached to and fixed relative to the casing 122. The motor 130 is attached to and fixed relative to the base 128. The sensor body 132, the at least one sensing device 108, the at least one sensor window 110, and the housing 104 are fixed relative to each other and are rotatably coupled to the base 128 to rotate about the housing axis H relative to the casing 122, e.g., by being rotatably drivably coupled to the motor 130.

The motor 130 is fixed relative to the base 128 and drivably coupled to the sensor body 132 and thereby drivably coupled to the housing 104. The motor 130 can be any suitable type for rotating the sensing devices 108, e.g., an electric motor. For example, the motor 130 can include a stator (not shown) fixed relative to the base 128 and a rotor (not shown) rotatable by the stator around the housing axis H and fixed relative to the sensor body 132.

The sensor body 132 includes walls 134, e.g., four vertical walls 134 as shown in the Figures, and a top panel 136. The walls 134 can have the same horizontal length, i.e., the walls 134 can form a square horizontal cross-section. The horizontal cross-section can be centered on the housing axis H, i.e., the housing axis H intersects a geometric center of the horizontal cross-section of the sensor body 132, making the rotation of the sensor body 132 balanced. The top panel 136 extends horizontally to each wall 134. The sensing devices 108 are contained inside the sensor body 132. The sensor body 132 is positioned inside the housing 104 and fixed relative to the housing 104.

The sensor body 132 includes a plurality of fins 138. The fins 138 are positioned on the walls 134. The fins 138 are oriented parallel to the housing axis H, i.e., axially relative to the housing axis H, e.g., elongated vertically along the respective wall 134 for the housing axis H being vertical. The fins 138 can be positioned on all of the walls 134. The fins 138 on each wall 134 extend parallel to each other. The fins 138 can extend perpendicularly from the respective wall 134. Each fin 138 has a length following a direction of elongation of the fin 138 along the wall 134, a width perpendicular to the wall 134, and a thickness in a horizontal direction along the wall 134. The fins 138 extend along their respective widths radially outward relative to the housing axis H from the sensor body 132 toward the housing 104. The length can be significantly greater than the width, e.g., more than twice as great. The width can be significantly greater than the thickness, e.g., more than five times as great. The fins 138 can be integral with the walls 134, i.e., made of a single, uniform piece of material with no seams, joints, fasteners, or adhesives holding it together.

The fins 138 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 138, along with the walls 134, may be aluminum. The high thermal conductivity of the fins 138 helps transfer away heat generated by the sensing devices 108 inside the sensor body 132, as does the large surface area created by the geometry of the fins 138.

The sensor unit 124 may be designed to detect features of the outside world; for example, the sensor unit 124 may be a radar sensor, a scanning laser range finder, a light detection and ranging (LIDAR) device, or an image processing sensor such as a camera. In particular, the sensor unit 124 may be a LIDAR device, e.g., a scanning LIDAR device. A LIDAR device detects distances to objects by emitting laser pulses at a particular wavelength and measuring the time of flight for the pulse to travel to the object and back. The operation of the sensor unit 124 is performed by the at least one sensing device 108, e.g., a LIDAR sensing device, inside the sensor body 132. For example, the sensor unit 124 can include two sensing devices 108. The sensing devices 108 have fields of view through the sensor windows 110 encompassing a region from which the sensor unit 124 receives input. As the sensing devices 108 rotate, the fields of view encompass a horizontal 360° around the vehicle 100.

The sensor devices can include at least one sensor window 110, e.g., two sensor windows 110, one sensor window 110 for each sensing device 108. The sensor windows 110 are each positioned on one of the walls 134. Each sensor window 110 can be off-center on the respective wall 134. For example, the sensor window 110 can be positioned closer to a trailing edge of the respective wall 134 than a leading edge of the wall 134 with respect to a direction of rotation of the sensor body 132. For example, each sensor window 110 can be positioned in a trailing half of the respective wall 134 with respect to the direction of rotation.

The sensor windows 110 can be flat. For example, the sensor windows 110 can have a rectangular shape. The sensor windows 110 are transparent with respect to whatever medium the sensing device 108 is capable of detecting. For example, if the sensor unit 124 is a LIDAR device, then the sensor windows 110 are transparent with respect to visible light at the wavelength generated and detectable by the sensing devices 108.

The housing 104 is fixedly attached to the sensor body 132, e.g., fastened to the top panel 136 of the sensor body 132. The housing 104 is rotatable around the housing axis H relative to the casing 122, along with the sensor body 132.

The housing 104 includes a cylindrical panel 140 and an end panel 142. The end panel 142 is flat and has a circular shape. The end panel 142 is attached, e.g., fastened, to the top panel 136 of the sensor body 132. The cylindrical panel 140 has a cylindrical shape defining the housing axis H, which is vertical. The cylindrical panel 140 has a constant circular cross-section extending upward along the housing axis H from a lower edge 144 to the end panel 142. The housing 104 is open at the lower edge 144, thereby permitting airflow into the sensor unit 124 and attachment of the sensor unit 124.

The cylindrical shell includes a plurality of slits 146. The slits 146 extend through the cylindrical panel 140 and are elongated parallel to the housing axis H. The slits 146 can be positioned radially outward from the fins 138 and are elongated parallel to the fins 138. As described below, the slits 146 permit airflow into the housing 104 to exit from the housing 104.

The sensor windows 110 are recessed from the cylindrical panel 140. The housing 104 of the sensor unit 124 includes window recesses 148 extending from the sensor window 110 and from the respective wall 134 radially outward to the cylindrical panel 140. The window recesses 148 can be integral with the cylindrical panel 140 or a separate piece from the cylindrical panel 140. Each window recess 148 can include a first recess panel 150, a second recess panel 152, a third recess panel 154, and a fourth recess panel 156. The recess panels 150, 152, 154, 156 extend radially inward from the cylindrical panel 140 toward the sensor window 110. The first recess panel 150 and the second recess panel 152 extend vertically upward from the third recess panel 154 to the fourth recess panel 156. The first recess panel 150 can be positioned in the direction of rotation of the sensor body 132 from the respective sensor window 110, i.e., as the sensor body 132 rotates, each first recess panel 150 leads the respective sensor window 110. The second recess panel 152 can be positioned on an opposite side of the sensor window 110 from the first recess panel 150. The second recess panel 152 can be positioned opposite the direction of rotation of the sensor body 132 from the respective sensor window 110, i.e., as the sensor body 132 rotates, each sensor window 110 leads the respective second recess panel 152.

Figure 4:
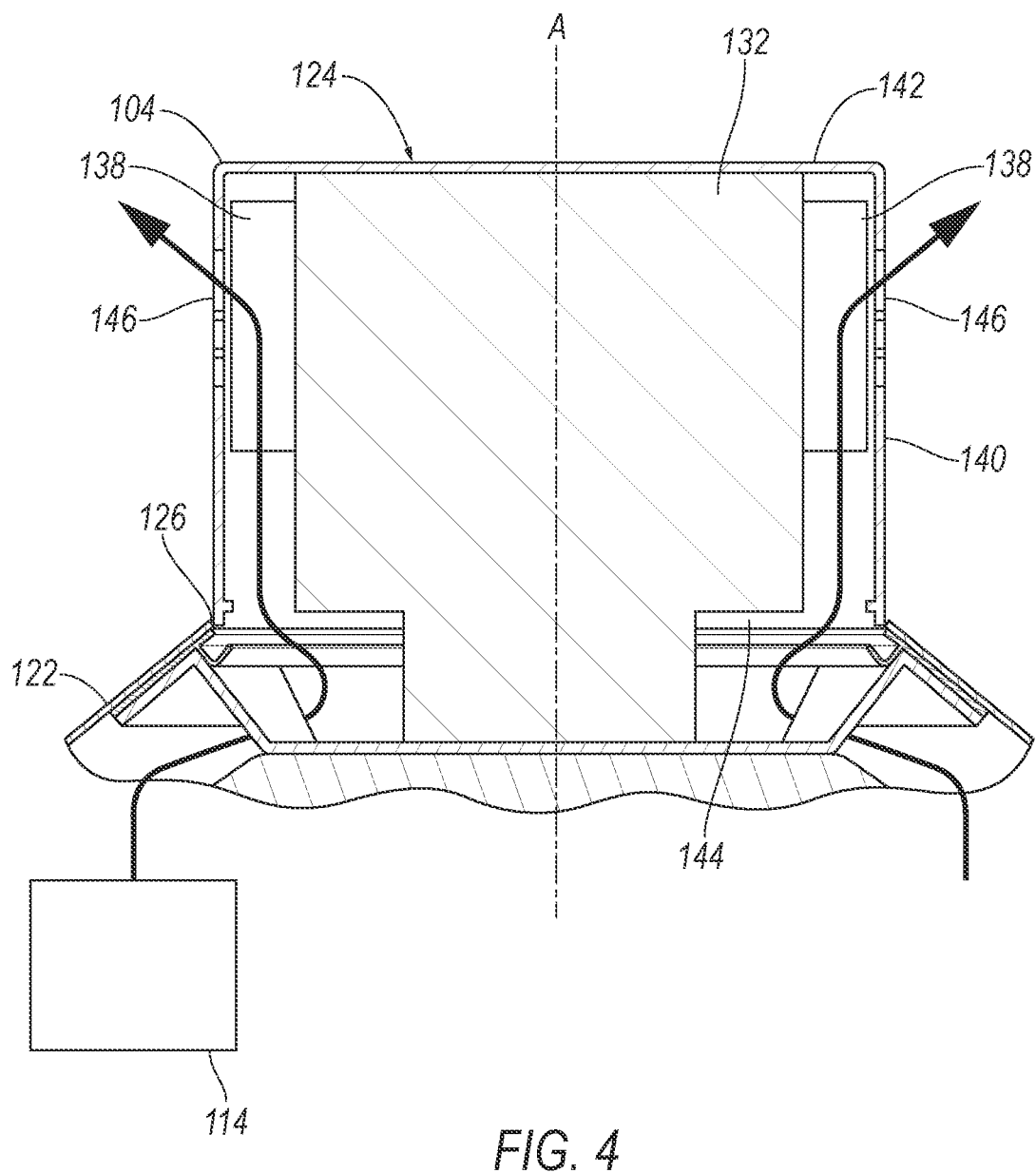
FIG. 4 is a diagrammatic side cross-sectional view of the sensor assembly.

With reference to FIG. 4, the sensor assembly 102 includes the pressurized-air source 114. The pressurized-air source 114 can be positioned inside the casing 122. The pressurized-air source 114 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 114 is positioned to discharge airflow through the aperture 126 of the casing 122 and into the housing 104 at the lower edge 144. The lower edge 144 is positioned to receive airflow from the casing 122. The fins 138 and the slits 146 are positioned to receive airflow traveling upward from the lower edge 144. For example, airflow that passes from the casing 122 through the lower edge 144 passes between the fins 138 and then exits the sensor unit 124 through the slits 146 and the outlets 106. The airflow thus transfers heat from the sensor body 132, thereby cooling the sensor body 132 and the sensing devices 108. The airflow is vertical through the lower edge 144, and the vertical orientation of the fins 138 and the slits 146 facilitates smooth airflow.

Figure 5:
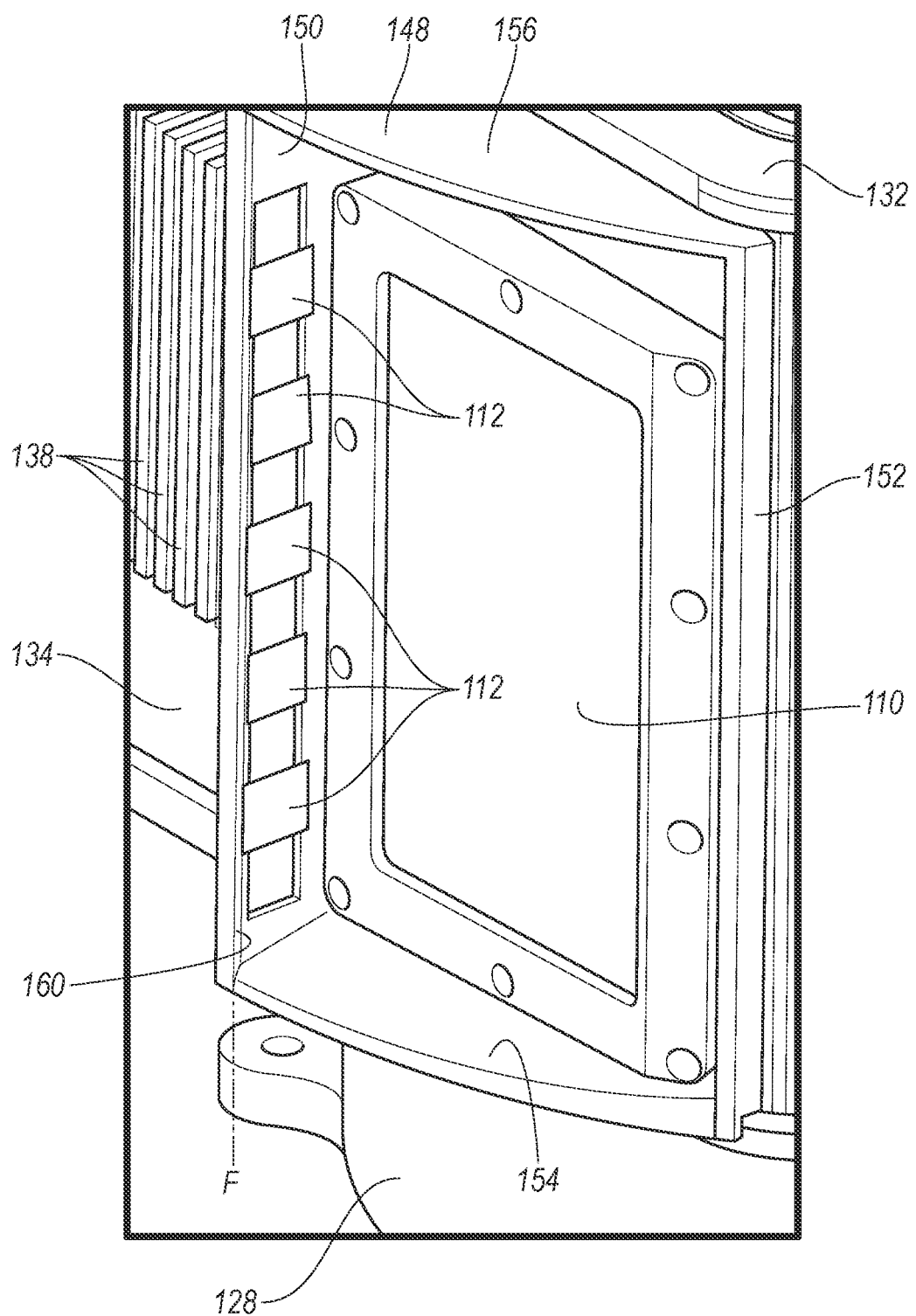
FIG. 5 is a perspective view of a portion of the sensor unit including a recessed sensor window.

With reference to FIG. 5, the window recesses 148 include the outlets 106 positioned to direct airflow entering the housing 104 across the sensor windows 110. For example, the first recess panels 150 can include the respective outlets 106. The outlets 106 can be positioned in the direction of rotation of the sensor body 132 from the respective sensor windows 110, i.e., as the sensor body 132 rotates, each outlet 106 leads the respective sensor window 110. The outlets 106 can be aimed across the respective sensor windows 110.

The outlets 106 can be elongated parallel to the respective sensor windows 110 alongside the sensor windows 110. The outlet 106 is elongated parallel to the housing axis H. The outlets 106 can extend vertically for a height of the respective sensor windows 110.

A plurality of the flaps 112 are positioned at each outlet 106. Each flap 112 is rotatably coupled to the housing 104 at the respective outlet 106, e.g., is rotatably coupled to the respective first recess panel 150. For example, each flap 112 can be freely rotatable about a pin 158 (seen in FIGS. 6A-B) that is positioned at a radially outer edge of the outlet 106 relative to the housing axis H. Alternatively, the flaps 112 can be integral with the first recess panel 150 and can rotate about a living hinge positioned at the radially outer edge of the outlet 106. The flaps 112 at each outlet 106 can be rotatable about a single flap axis F that is parallel to the housing axis H defined by the cylindrical panel 140, i.e., that is parallel to the direction of elongation of the outlet 106. The flaps 112 are rotatable independently of each other.

The flaps 112 can have the same shape as each other. The flaps 112 can have a generally flat shape. The flaps 112 can extend vertically parallel to the flap axis F and can extend radially outward from the flap axis F. A length of each flap 112 radially outward can be greater than a width of the respective outlet 106, i.e., than a dimension of the outlet 106 perpendicular to the direction of elongation of the outlet 106.

The flaps 112 can be arranged in series along the flap axis F, i.e., along the direction of elongation of the outlet 106. The flaps 112 can be spaced from each other along the direction of elongation, i.e., adjacent flaps 112 can define a gap therebetween in the direction of elongation of the outlet 106. The gaps between different pairs of adjacent flaps 112 can be the same length.

Figure 6A:
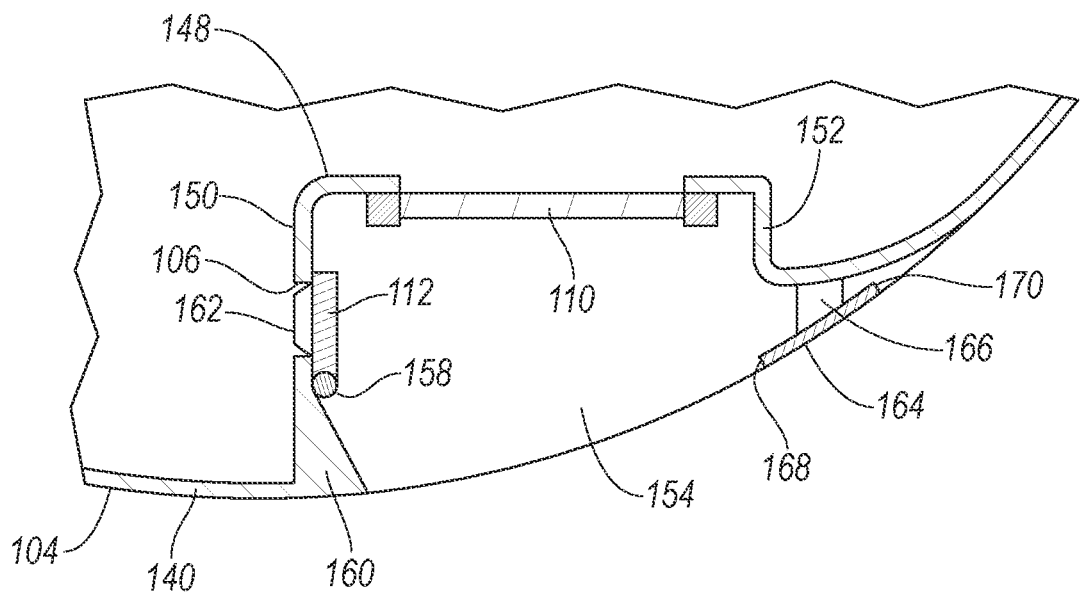
FIG. 6A is a top cross-sectional view of a portion of the sensor unit with a flap in a closed position.
Figure 6B:
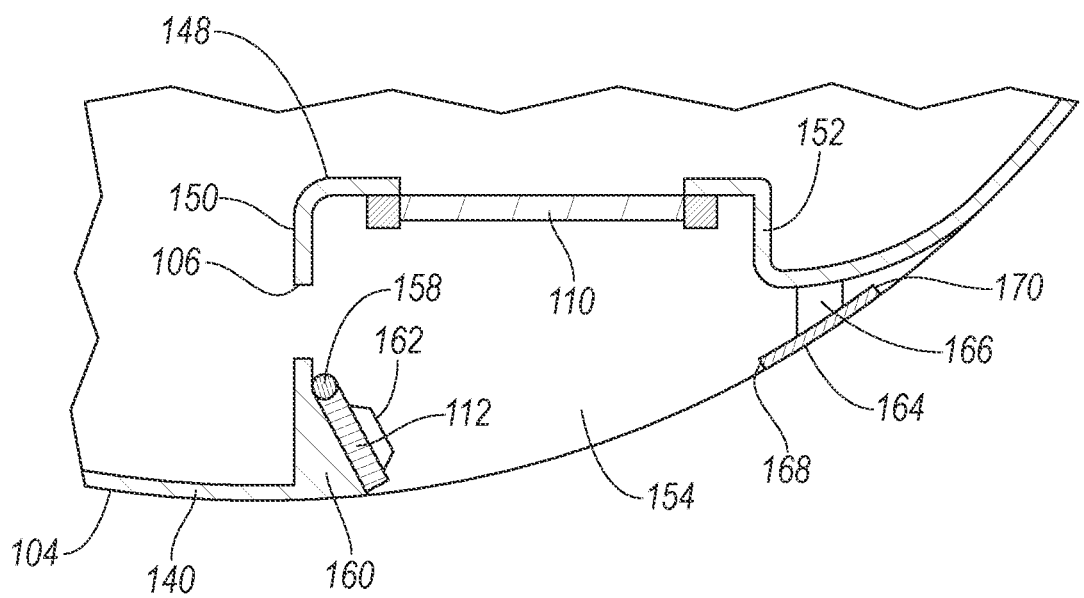
FIG. 6B is a top cross-sectional view of the portion of the sensor unit with the flap in an open position.

With reference to FIGS. 6A-B, each flap 112 is rotatable between the closed position, as shown in FIG. 6A, and the open position, as shown in FIG. 6B. The flap 112 in the closed position extends across the respective outlet 106 in a direction perpendicular to the direction of elongation of the outlet 106. The flap 112 in the closed position impedes airflow through the outlet 106. Because the width of the outlet 106 is shorter than the length of the flap 112, the first recess panel 150 blocks the flap 112 from rotating farther away from the open position than being in the closed position. The flap 112 in the open position is angled away from the outlet 106. The flap 112 in the open position permits airflow through the outlet 106 without interference from that flap 112.

The sensor assembly 102 includes members 160 fixed to the housing 104, e.g., to the respective first recess panels 150 radially outward from the respective outlet 106 relative to housing axis H defined by the cylindrical panel 140. For example, the members 160 can be integral with the first recess panels 150. The member 160 is positioned to block the flaps 112 from opening farther from the outlet 106 than the open position. Each flap 112 in the open position abuts the respective member 160. Each flap 112 has a range of motion from the closed position to the open position. The range of motion can be less than 180°. The flap 112 in the open position can be inside an outer radius of the cylindrical panel 140, thereby not creating turbulence from the rotation of the cylindrical panel 140 regardless of the position of the flap 112.

The flaps 112 can include vanes 162. The vanes 162 can be positioned to extend into the outlet 106 when the flaps 112 are in the closed position, as shown in FIG. 6A. The vanes 162 can be elongated perpendicular to the direction of elongation of the outlet 106. The vanes 162 can be positioned to guide airflow horizontally past the flap 112 when the flap 112 is in the open position or in an intermediate position between the open and closed positions.

As air exits the housing 104 through the outlet 106, the airflow causes the flaps 112 to move back and forth between the closed and open positions. The flaps 112 may not move fully to the open position or to the closed position. For example, the flaps 112 may oscillate between an intermediate position closer to the closed position and an intermediate position closer to the open position. The flaps 112 may move with an oscillatory or fluttering motion. This motion may cause the airflow across the sensor window 110 to have more turbulence and to have spurts of airflow. This pattern of airflow can be more effective at removing small water droplets, as described above.

The sensor assembly 102 can include back panels 164 positioned radially outward from the respective second recess panels 152. The back panels 164 are spaced from the housing 104 to permit airflow between the back panels 164 and the housing 104. The back panels 164 are fixed relative to the housing 104, e.g., via ribs 166. The ribs 166 can each extend from the housing 104 to the respective back panel 164. The ribs 166 can extend radially and circumferentially relative to the housing axis H and have a thickness oriented axially relative to the housing axis H, as shown in FIG. 5, to minimize interference with airflow between the respective back panel 164 and the housing 104.

Each back panel 164 extends circumferentially from a first edge 168 nearer to the respective sensor window 110 to a second edge 170 farther from the respective sensor window 110. The first edge 168 and the second edge 170 can extend parallel to the housing axis H defined by the cylindrical panel 140, i.e., parallel to the direction of elongation of the respective outlet 106.

A radial distance between the back panel 164 and the housing 104, e.g., the second recess panel 152, at the first edge 168 is greater than a radial distance between the back panel 164 and the housing 104, e.g., the cylindrical panel 140, at the second edge 170. The radial distance between the back panel 164 and the housing 104 can decrease, e.g., smoothly decrease, as measured traveling circumferentially around the housing axis H from the first edge 168 to the second edge 170 of the back panel 164. The gap between the back panel 164 and the housing 104 can be constant as measured traveling axially relative to the housing axis H defined by the cylindrical panel 140, i.e., as measured traveling vertically.

The airflow from the outlet 106 may move across the sensor window 110 and enter the gap between the back panel 164 and the housing 104. The airflow can pull water droplets from the trailing edge of the sensor window 110, i.e., from the radially inner edge of the second recess panel 152, thereby preventing pooling at the trailing edge of the sensor window 110. The narrowing gap between the back panel 164 and the housing 104 increases airflow speed, forcing airflow past the second edge 170 of the back panel 164 at a speed that throws the water droplets away from the sensor assembly 102.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor assembly comprising:
a housing including an outlet;
a sensing device including a sensor window, the sensor window fixed relative to the housing, the outlet being aimed across the sensor window;
a flap rotatably coupled to the housing at the outlet, the flap being rotatable between an open position angled away from the outlet and a closed position extending across the outlet; and
a base;
wherein the housing includes a cylindrical panel;
the sensor window is recessed from the cylindrical panel; and
the housing is rotatably coupled to the base to rotate about an axis defined by the cylindrical panel.

2. The sensor assembly of claim 1, further comprising a member fixed to the housing and positioned to block the flap from opening farther from the outlet than the open position.

3. The sensor assembly of claim 1, wherein the outlet is elongated parallel to the sensor window alongside the sensor window in a direction of elongation, and the flap in the closed position extends across the outlet in a direction perpendicular to the direction of elongation.

4. The sensor assembly of claim 3, further comprising a plurality of flaps including the flap, the flaps each being rotatable between the open position angled away from the outlet and the closed position extending across the outlet in the direction perpendicular to the direction of elongation.

5. The sensor assembly of claim 4, wherein the flaps are arranged in series along the direction of elongation of the outlet.

6. The sensor assembly of claim 4, wherein the flaps are spaced from each other along the direction of elongation.

7. The sensor assembly of claim 4, further comprising a member fixed to the housing and positioned to block the flaps from opening farther from the outlet than the open position.

8. The sensor assembly of claim 4, wherein the flaps include vanes, the vanes are positioned to extend into the outlet when the flaps are in the closed position.

9. The sensor assembly of claim 8, wherein the vanes are elongated perpendicular to the direction of elongation of the outlet.

10. The sensor assembly of claim 4, wherein the flaps are rotatable independently of each other.

11. The sensor assembly of claim 1, wherein the housing includes a recess panel extending radially inward from the cylindrical panel toward the sensor window, and the recess panel includes the outlet.

12. The sensor assembly of claim 11, wherein the outlet is elongated parallel to the axis defined by the cylindrical panel.

13. The sensor assembly of claim 11, further comprising a member fixed to the recess panel and positioned to block the flap from opening farther from the outlet than the open position.

14. The sensor assembly of claim 13, wherein the flap in the open position is inside an outer radius of the cylindrical panel.

15. The sensor assembly of claim 11, wherein the recess panel is a first recess panel, the housing includes a second recess panel extending radially inward from the cylindrical panel toward the sensor window, and the second recess panel is positioned on an opposite side of the sensor window than the first recess panel.

16. The sensor assembly of claim 15, further comprising a back panel fixed relative to the housing, positioned radially outward from the second recess panel, and spaced from the housing.

17. The sensor assembly of claim 16, wherein the back panel extends circumferentially from a first edge nearer to the sensor window to a second edge farther from the sensor window, and a radial distance between the back panel and the housing at the first edge is greater than a radial distance between the back panel and the housing at the second edge.

18. The sensor assembly of claim 16, further comprising a rib extending from the housing to the back panel.

19. A sensor assembly comprising:
a housing including an outlet;
a sensing device including a sensor window, the sensor window fixed relative to the housing, the outlet being aimed across the sensor window; and
a plurality of flaps, the flaps each being rotatably coupled to the housing at the outlet, the flaps each being rotatable between an open position angled away from the outlet and a closed position extending across the outlet;
wherein the outlet is elongated parallel to the sensor window alongside the sensor window in a direction of elongation;
the flaps in the closed position each extending across the outlet in a direction perpendicular to the direction of elongation.

20. A sensor assembly comprising:
a housing including an outlet;
a sensing device including a sensor window, the sensor window fixed relative to the housing, the outlet being aimed across the sensor window;
a flap rotatably coupled to the housing at the outlet, the flap being rotatable between an open position angled away from the outlet and a closed position extending across the outlet; and
a member;
wherein the housing includes a cylindrical panel;
the sensor window is recessed from the cylindrical panel;
the housing includes a recess panel extending radially inward from the cylindrical panel toward the sensor window;
the recess panel includes the outlet;
the member is fixed to the recess panel and positioned to block the flap from opening farther from the outlet than the open position; and
the flap in the open position is inside an outer radius of the cylindrical panel.

21. A sensor assembly comprising:
a housing including an outlet;
a sensing device including a sensor window, the sensor window fixed relative to the housing, the outlet being aimed across the sensor window; and
a flap rotatably coupled to the housing at the outlet, the flap being rotatable between an open position angled away from the outlet and a closed position extending across the outlet;
wherein the housing includes a cylindrical panel;
the sensor window is recessed from the cylindrical panel;
the housing includes a first recess panel extending radially inward from the cylindrical panel toward the sensor window;
the first recess panel includes the outlet;
the housing includes a second recess panel extending radially inward from the cylindrical panel toward the sensor window; and
the second recess panel is positioned on an opposite side of the sensor window than the first recess panel.

* * * * *